US010823417B2

(12) United States Patent  
Clum et al.

(10) Patent No.: US 10,823,417 B2  
(45) Date of Patent: Nov. 3, 2020

(54) COMBUSTOR WITH PARTICLE COLLECTION PANEL HAVING A PLURALITY OF PARTICLE COLLECTION CHAMBERS

(71) Applicant: UNITED TECHNOLOGIES CORPORATION, Farmington, CT (US)

(72) Inventors: Carey Clum, East Hartford, CT (US); Shayan Ahmadian, Oakdale, CT (US); Christopher W. Robak, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 328 days.

(21) Appl. No.: 15/709,333

(22) Filed: Sep. 19, 2017

(65) Prior Publication Data

US 2019/0086084 A1    Mar. 21, 2019

(51) Int. Cl.
*F23R 3/04* (2006.01)
*F23R 3/00* (2006.01)
*B01D 45/08* (2006.01)
*F23R 3/06* (2006.01)

(52) U.S. Cl.
CPC ............. *F23R 3/04* (2013.01); *B01D 45/08* (2013.01); *F23R 3/002* (2013.01); *F23R 3/06* (2013.01); *F05D 2260/201* (2013.01); *F05D 2260/202* (2013.01); *F05D 2260/203* (2013.01); *F05D 2260/607* (2013.01); *F23R 2900/00004* (2013.01);
(Continued)

(58) Field of Classification Search
CPC .... F23R 3/002; F23R 3/02; F23R 3/04; F23R 3/06; F05D 2260/201; F05D 2260/202;
(Continued)

(56) References Cited

U.S. PATENT DOCUMENTS

| 4,269,032 A | * | 5/1981 | Meginnis | ................ | F23R 3/002 416/97 A |
| 4,614,082 A |   | 9/1986 | Sterman et al. | | |

(Continued)

FOREIGN PATENT DOCUMENTS

| DE | 4244302 | 6/1994 |
| EP | 0624757 | 11/1994 |

(Continued)

OTHER PUBLICATIONS

Jake Miller, "Calculating Pressure Drop Across Sharp-Edged Perforated Plates", Jun. 14, 2017, Applied Flow Technology: AFT Product Tips, https://www.aft.conn/support/product-tips/entry/2017/06/14/calculating-the-pressure-drop-across-sharp-edged-perforated-plates, retrieved Dec. 12, 2019 (Year: 2017).*

(Continued)

*Primary Examiner* — Gerald L Sung  
*Assistant Examiner* — Stephanie Cheng  
(74) *Attorney, Agent, or Firm* — Snell & Wilmer L.L.P.

(57) ABSTRACT

A combustor may include a combustor shell, a particle collection panel, and a combustor panel. The combustor shell may define a plurality of first impingement holes, the particle collection panel may include a plurality of particle collection chambers and may define a plurality of second impingement holes, and the combustor panel may define a plurality of effusion holes. The particle collection panel may be disposed inward of the combustor shell and the combustor panel may be disposed inward of the particle collection panel. Each particle collection chamber may have a closed inward end and an opening defined in an outward end. The particle collection chambers may be configured to entrap particulates.

9 Claims, 6 Drawing Sheets

(52) U.S. Cl.
CPC ............... *F23R 2900/03041* (2013.01); *F23R 2900/03042* (2013.01); *F23R 2900/03043* (2013.01); *F23R 2900/03044* (2013.01); *F23R 2900/03045* (2013.01)

(58) Field of Classification Search
CPC ......... F05D 2260/203; F05D 2260/204; F05D 2260/205; F05D 2260/221; F05D 2260/2212; F05D 2260/2214; F05D 2260/2141; F05D 2260/231; F05D 2260/232; F05D 2260/63; F02C 7/05; F02C 7/052; B64D 2033/0246; B64D 31/06; B64D 33/022; B01D 45/04; B01D 45/08
See application file for complete search history.

(56) References Cited

U.S. PATENT DOCUMENTS

| | | | |
|---|---|---|---|
| 4,838,031 A | 6/1989 | Cramer | |
| 6,681,578 B1* | 1/2004 | Bunker | F23R 3/005 60/759 |
| 7,270,175 B2* | 9/2007 | Mayer | F01D 25/08 165/170 |
| 8,931,280 B2 | 1/2015 | Kaleeswaran et al. | |
| 9,638,047 B1 | 5/2017 | Jones | |
| 2012/0198854 A1 | 8/2012 | Schilp et al. | |
| 2012/0275900 A1* | 11/2012 | Snider | F01D 9/023 415/108 |
| 2016/0230994 A1 | 8/2016 | Pidcock et al. | |

FOREIGN PATENT DOCUMENTS

| | | |
|---|---|---|
| EP | 2730748 | 5/2014 |
| EP | 3176372 | 6/2017 |

OTHER PUBLICATIONS

European Patent Office, European Search Report dated Nov. 20, 2018 in Application No. 18194189.9.

* cited by examiner

COMBUSTOR WITH PARTICLE COLLECTION PANEL HAVING A PLURALITY OF PARTICLE COLLECTION CHAMBERS

FIELD

The present disclosure relates to combustors, and more specifically, to capturing particles from cooling air in a combustor of a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Combustors used in gas turbine engines generally rely on combustor panels, attached to a combustor shell, to interface with hot combustion gases and guide the combustion gases into the turbine. Cooling air generally flows from a diffuser chamber through impingement holes of the combustor shell and then flows through the combustor panel via effusion holes into the combustion chamber. However, dirt, debris, sand, and/or other particulate matter entrained with the cooling airflow, if allowed to enter the combustion chamber, can have an adverse effect on the operational life, efficiency, and performance of the combustor.

SUMMARY

In various embodiments, the present disclosure provides a particle collection panel configured to be disposed between a combustor shell and a combustor panel of a combustor of a gas turbine engine. The particle collection panel may include a plurality of particle collection chambers and a plurality of impingement holes. In various embodiments, each particle collection chamber of the plurality of particle collection chambers includes an open outward end and a closed inward end. In various embodiments, the plurality of particle collection chambers extend outward from an outward surface of the particle collection panel. In various embodiments, the plurality of particle collection chambers are cylindrical compartments.

Also disclosed herein, according to various embodiments, is a combustor that includes a combustor shell, a particle collection panel, and a combustor panel. The combustor shell defines a plurality of first impingement holes, according to various embodiments. The particle collection panel includes a plurality of particle collection chambers and defines a plurality of second impingement holes, according to various embodiments. The particle collection panel may be disposed inward of the combustor shell. The combustor panel defines a plurality of effusion holes, according to various embodiments. The combustor panel may be disposed inward of the particle collection panel.

In various embodiments, each particle collection chamber of the plurality of particle collection chambers has a closed inward end and an opening defined in an outward end. The plurality of first impingement holes may be aligned with the opening of the plurality of particle collection chambers. For example, a centerline axis of the opening of each particle collection chamber of the plurality of particle collection chambers may intersect a respective first impingement hole of the plurality of first impingement holes. In various embodiments, a first quantity of the first impingement holes corresponds to a second quantity of the particle collection chambers. For example, the first quantity equals the second quantity, according to various embodiments.

In various embodiments, a first cumulative cross-sectional area of the plurality of first impingement holes is substantially equal to a sum of a second cumulative cross-sectional area of the plurality of second impingement holes and a third cumulative cross-sectional area of the plurality of effusion holes. In various embodiments, each first impingement hole of the plurality of first impingement holes has a first diameter, wherein a distance between the combustor shell and an opening defined in an outward end of each particle collection chamber is more than 0.5 times the first diameter. In various embodiments, each first impingement hole of the plurality of first impingement holes has a first diameter, wherein a distance between the combustor shell and an opening defined in an outward end of each particle collection chamber is greater than 0.5 times the first diameter and less than 2.0 times the first diameter. In various embodiments, each first impingement hole of the plurality of first impingement holes has a first diameter and each particle collection chamber of the plurality of particle collection chambers defines an opening having a second diameter, wherein the second diameter is at least 0.2 times the first diameter.

Also disclosed herein, according to various embodiments, is a gas turbine engine that includes a combustor shell defining a plurality of first impingement holes, a particle collection panel comprising a plurality of particle collection chambers and defining a plurality of second impingement holes, and a combustor panel defining a plurality of effusion holes. The particle collection panel is disposed inward of the combustor shell and the combustor panel is disposed inward of the particle collection panel, according to various embodiments.

In various embodiments, the opening of each particle collection chamber of the plurality of particle collection chambers is circumferentially aligned with and axially offset in an aft direction from a respective first impingement hole of the plurality of first impingement holes. For example, each first impingement hole of the plurality of first impingement holes has a first diameter, wherein the opening of each particle collection chamber of the plurality of particle collection chambers is offset in the aft direction about 0.5 times the first diameter.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
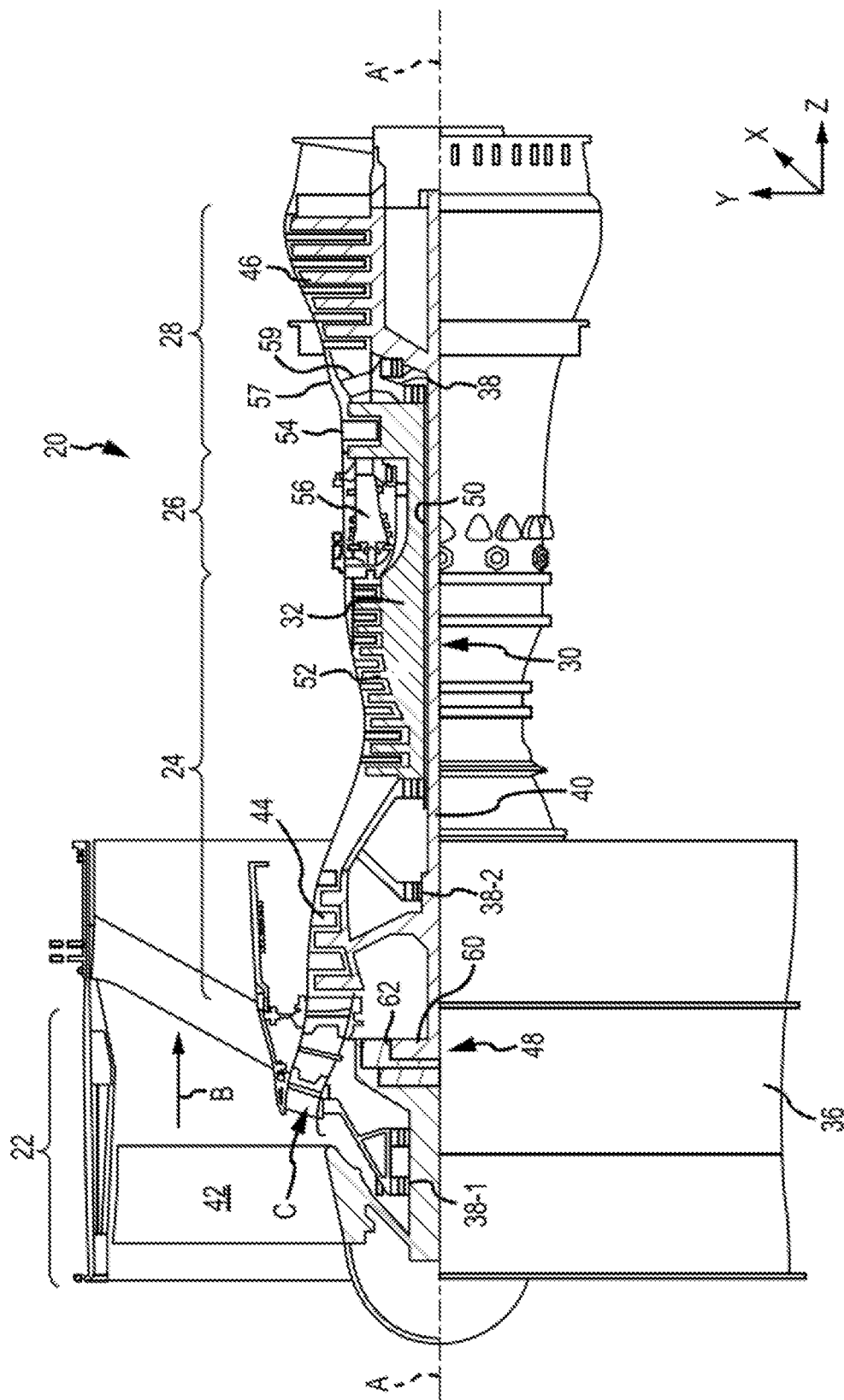
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may have a mid-turbine vane 59 and may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
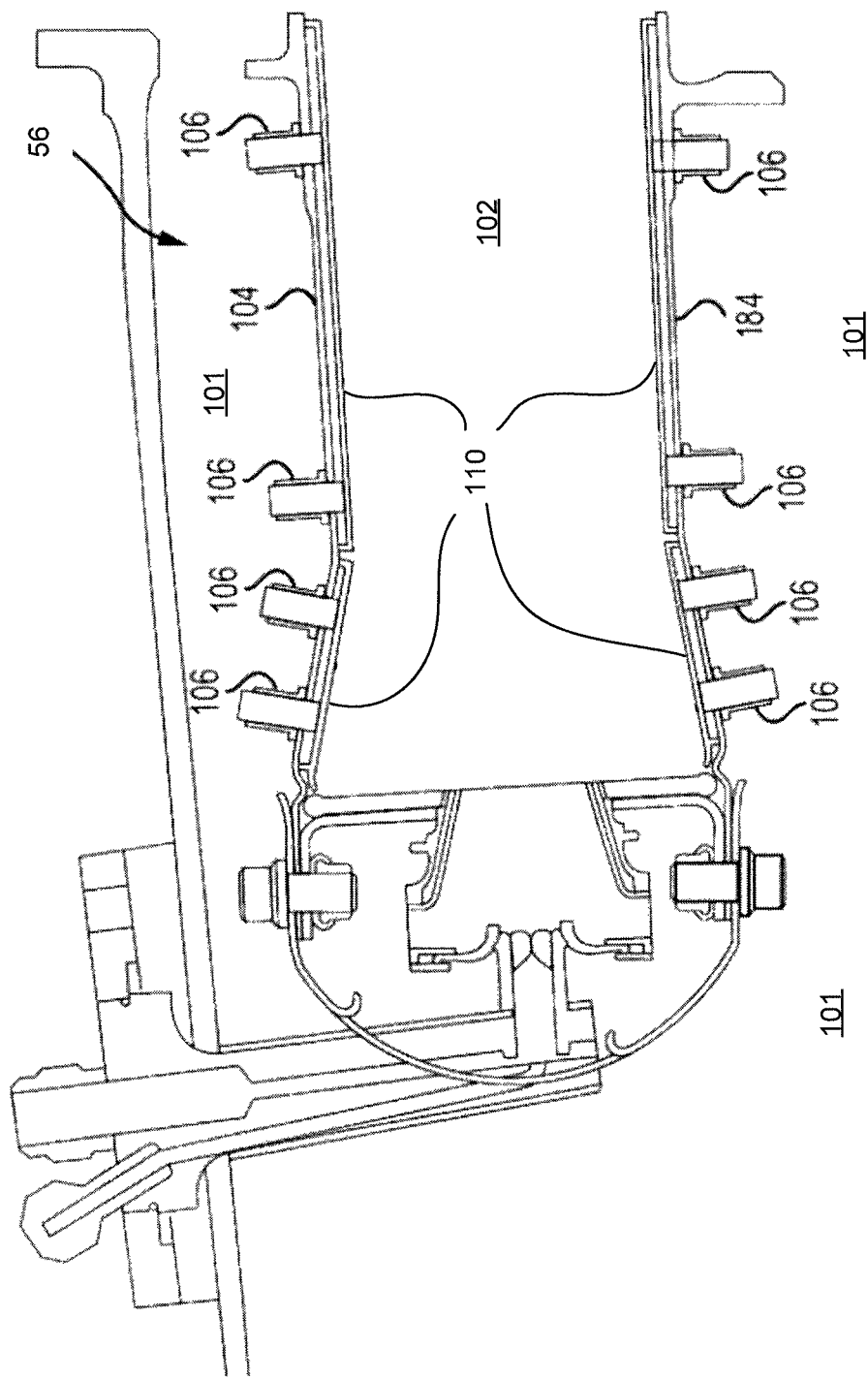
FIG. 2 is a cross-sectional view of a combustor of a gas turbine engine, in accordance with various embodiments.

With reference to FIG. 2, an in accordance with various embodiments, one or more combustor panels 110 (e.g., thermal shields, combustor liners) may be positioned in combustor 56 to protect various features of the combustor 56 from the high temperature flames and/or combustion gases. The combustor 56, in various embodiments, may have a combustor chamber 102 defined by a combustor outer shell 104 and a combustor inner shell 184. A diffuser chamber 101 is external the combustor 56 and cooling air may be configured to flow through the diffuser chamber 101 around the combustor 56. The combustor chamber 102 may faun a region of mixing of core airflow C (with brief reference to FIG. 1) and fuel, and may direct the high-speed exhaust gases produced by the ignition of this mixture inside the combustor 56. The combustor outer shell 104 and the combustor inner shell 184 may provide structural support to the combustor 56 and its components. For example, a combustor outer shell 104 and a combustor inner shell 184 may comprise a substantially cylindrical or a substantially conical canister portion defining an inner area comprising the combustor chamber 102.

As mentioned above, it may be desirable to protect the combustor outer shell 104 and the combustor inner shell 184 from the harmful effects of high temperatures. Accordingly, one or more combustor panels 110 may be disposed inside the combustor chamber 102 and may provide such protection, and may be mounted to the combustor shell using one ore more attachment features 106. The combustor panels 110 may comprise a partial cylindrical or conical surface section. An outer combustor thermal panel may be arranged radially inward of the combustor outer shell 104, for example, circumferentially about the inner surface of the combustor outer shell 104 and one or more inner combustor panels may also be arranged radially outward of the combustor inner shell 184. Thus, while the terms "radially outward" and "radially inward" are defined above as being relative to the engine central longitudinal axis A-A', the terms "outward" and "inward," without the modifier "radially", refer to positions relative to the combustor chamber 102. That is, the combustor shells 104, 184 are outward of the combustor panels 110, and vice versa. The combustor panels 110 may comprise a variety of materials, such as metal, metal alloys, and/or ceramic matrix composites, among others.

Figure 3A:
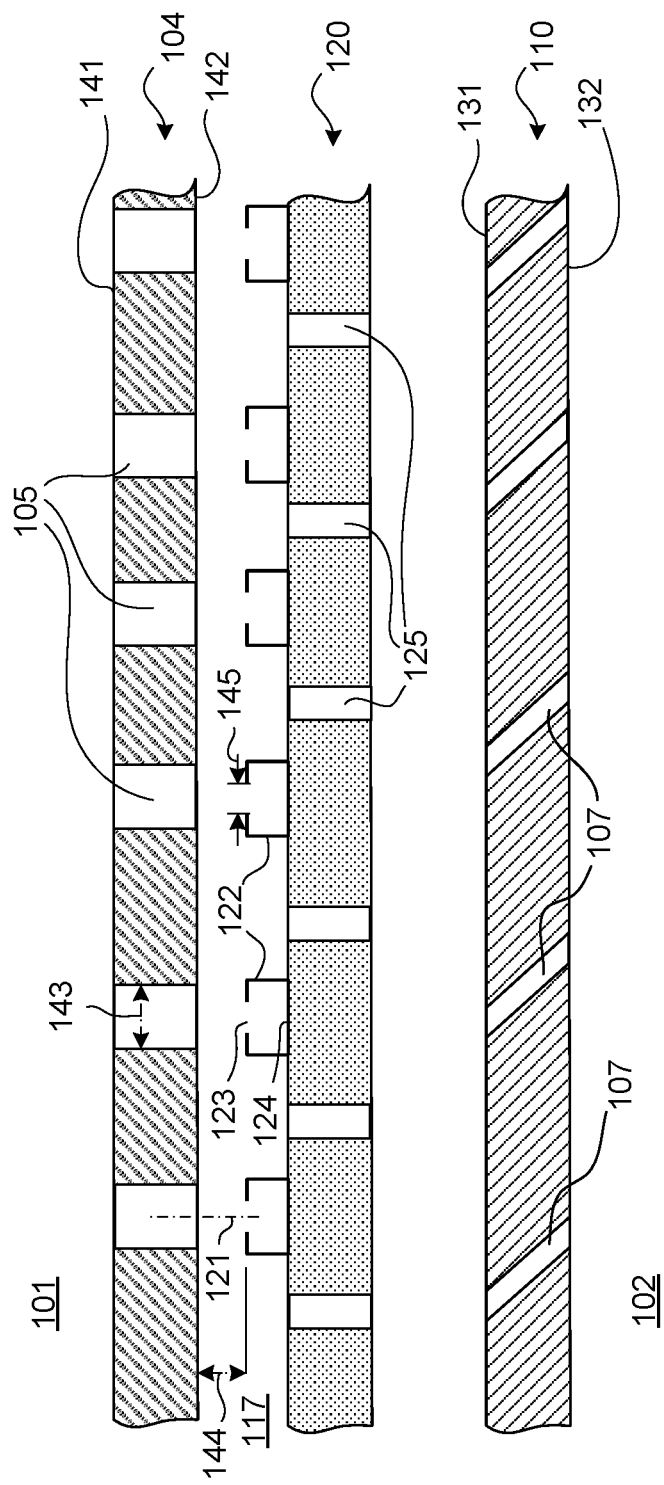
FIG. 3A is a cross-sectional view of a combustor of a gas turbine engine, in accordance with various embodiments.
Figure 3B:
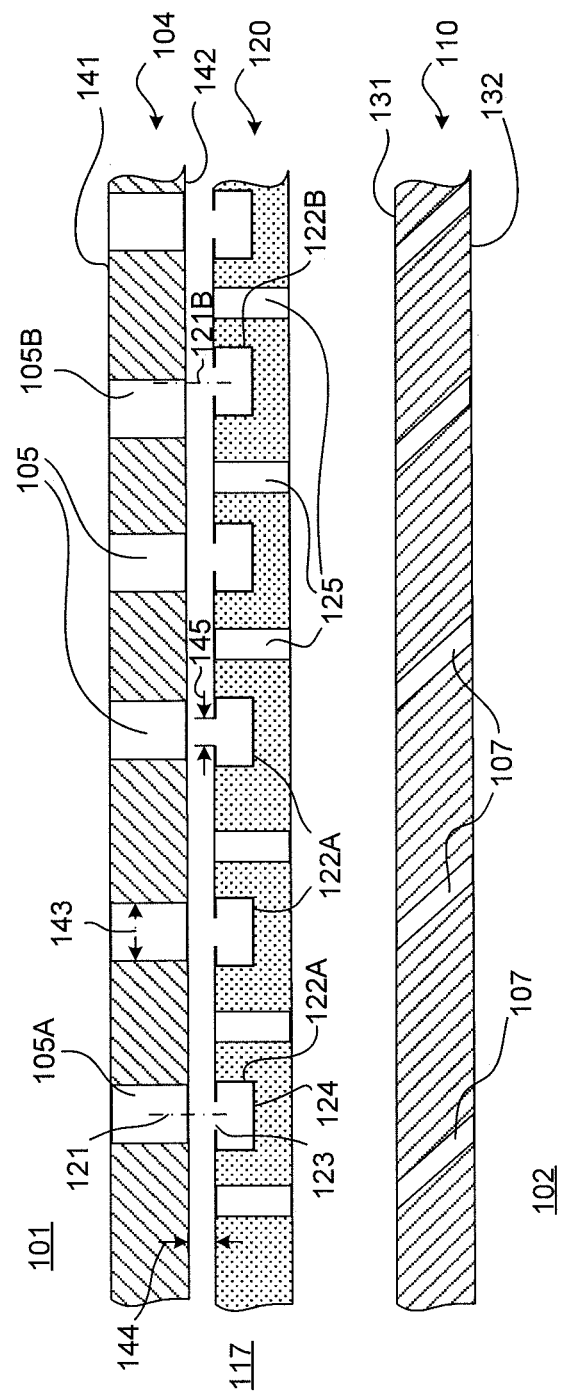
FIG. 3B is a cross-sectional view of a combustor of a gas turbine engine, in accordance with various embodiments.

In various embodiments, and with reference to FIGS. 3A and 3B, an annular cooling cavity 117 is formed and/or defined between the combustor shell 104 and the combustor panel 110. As mentioned above, cooling air in the diffuser chamber 101 may enter the annular cooling cavity 117 via impingement holes 105 formed in the combustor shell 104. That is, impingement holes 105 may extend from a diffuser-facing side 141 of the combustor shell 104 to a combustor-facing side 142 of the combustor shell 104 and may supply cooling air to the annular cooling cavity 117. The cooling air in the annular cooling cavity 117 may enter the combustor chamber 102 via effusion holes 107 formed in the combustor panel. That is, effusion holes 107 may extend from a cooling surface or "cold side" 131 of the combustor panel to a combustion facing surface or "hot side" 132 of the combus-tor panel that is opposite the cold side 131. In various embodiments, the effusion holes 107 are generally oriented to create a protective "blanket" of air film over the hot side 132 of the combustor panel thereby protecting the combustor panel from the hot combustion gases in the combustor chamber 102.

In various embodiments, a particle collection panel 120 may be disposed between the combustor shell 104 and the combustor panel 110 (e.g., in the annular cooling cavity 117). That is, the particle collection panel 120 may be inward of the combustor shell 104, and the combustor panel 110 is disposed inward of the particle collection panel 120. The particle collection panel 120 may be configured to collect/entrap dirt, debris, sand, and/or other particulate matter from the cooling air via an aerodynamic lensing effect. Aerodynamic lensing is an effect that concentrates particles into a collection chamber, thus separating the particles from a fluid flow stream. That is, cooling air flowing through the diffuser chamber 101 flows through the impingement holes formed in the combustor shell 104, referred to herein as the plurality of first impingement holes 105, and is directed generally towards an opening 123 of respective particle collection chambers 122 of the particle collection panel 120.

Particles in the cooling air, such as dirt, debris, or other particulate matter, are focused into the particle collection chambers 122. In various embodiments, the fluid stream (e.g., the cooling air) does not enter the particle collection chambers 122 because the particle collection chambers 122 do not have an outlet/exit and are thus no-flow regions. Said differently, due to the momentum and trajectory of the particles, in response to passing through and exiting from the first impingement holes 105, the particles flow through an opening 123 formed in an outward end of the particle collection chamber 122 and impact a closed end 124 (e.g., back wall) of the particle collection chamber 122 where they are retained. The fluid (e.g., cooling air), having less momentum, is diverted away from the particle collection chamber 122. Thus, the fluid downstream of the particle collection chambers 122 has a substantial portion of the particles stripped from the stream and is therefore "cleaner" and thus well-suited to flow through a plurality of second impingement holes 125 defined in the particle collection panel 120 and through the effusion holes 107 defined in the combustor panel 110 into the combustion chamber 102. Said differently, the amount of particles (e.g., the flux of particulate matter) reaching the combustion chamber 102 is reduced by incorporating the particle collection panel 120 between the combustor shell 104 and the combustor panel 110. By removing or reducing the amount of particles that flow into the combustion chamber 102 via the cooling configuration, the operational life of the combustor may be increased, the operating efficiency of the combustor may be increased, and/or the operating performance of the combustor may be increased, according to various embodiments.

In various embodiments, and with reference to FIG. 3A, each particle collection chamber 122 extends outward from an outward surface of the particle collection panel 120. In various embodiments, and with reference to FIG. 3B, each particle collection chamber 122A is a cavity or a closed aperture defined in the body of the particle collection panel 120. In various embodiments, the particle collection chambers 122 are cylindrical compartments.

In various embodiments, the plurality of first impingement holes 105 are aligned with the opening 123 of the particle collection chambers 122. For example, a centerline axis 121 of the opening 123 of each particle collection chamber 122 intersects a respective first impingement hole 105A of the plurality of first impingements holes. In various embodiments, and with reference to FIG. 3A, the centerline axis 121 is coincident with a centerline axis of the respective first impingement hole 105. In various embodiments, and with reference to FIG. 3B, centerline axis 121B of the opening of particle collection chamber 122B is circumferentially aligned with, but axially offset in an aft direction from, a respective first impingement hole 105B. That is, depending on the flow characteristics of the cooling airflow exiting the first impingement holes, the particle collection chamber 122B may be slightly offset in the aft direction, relative to the first impingement holes 105B. In various embodiments, each first impingement hole 105 has a first diameter 143, and the opening of each particle collection chamber 122B of the magnitude of the offset of the plurality of particle collection chambers in the aft direction, relative to a centerline axis of the first impingement hole 105B, is about 0.5 times the first diameter 143.

In various embodiments, a first quantity of the first impingement holes 105 corresponds to a second quantity of the particle collection chambers 122. For example, the ratio of first impingement holes 105 to particle collection chambers 122 may be 1:1. That is, the first quantity may equal the second quantity. In various embodiments, a distance 144 between the combustor shell 104 and the opening 123 defined in the outward end of each particle collection chamber 122 is more than 0.5 times the first diameter 143. In various embodiments, the distance 144 between the combustor shell 104 and the opening 123 defined in the outward end of each particle collection chamber 122 is greater than 0.5 times the first diameter 143 but less than 2.0 times the first diameter. In various embodiments, the opening 123 of each particle collection chamber 122 has a second diameter 145 that is at least 0.2 times the first diameter 143. In various embodiments, a first cumulative cross-sectional area of the plurality of first impingement holes 105 is substantially equal to a sum of both a second cumulative cross-sectional area of the plurality of second impingement holes 125 and a third cumulative cross-sectional area of the plurality of effusion holes 107.

Figure 4:
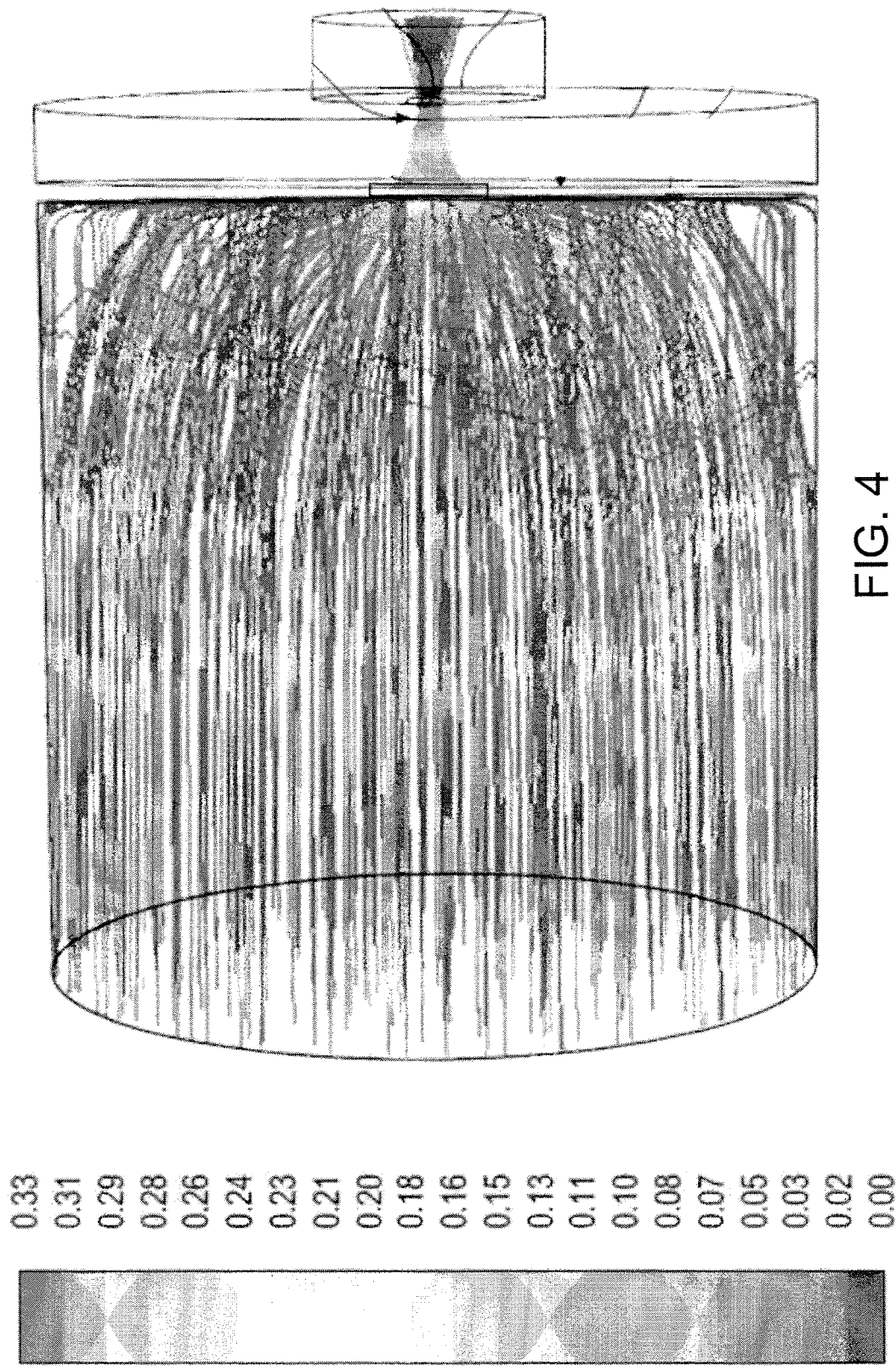
FIG. 4 is a graphical illustration of a 5 micron particle track into a particle collection device, in accordance with various embodiments.
Figure 5:
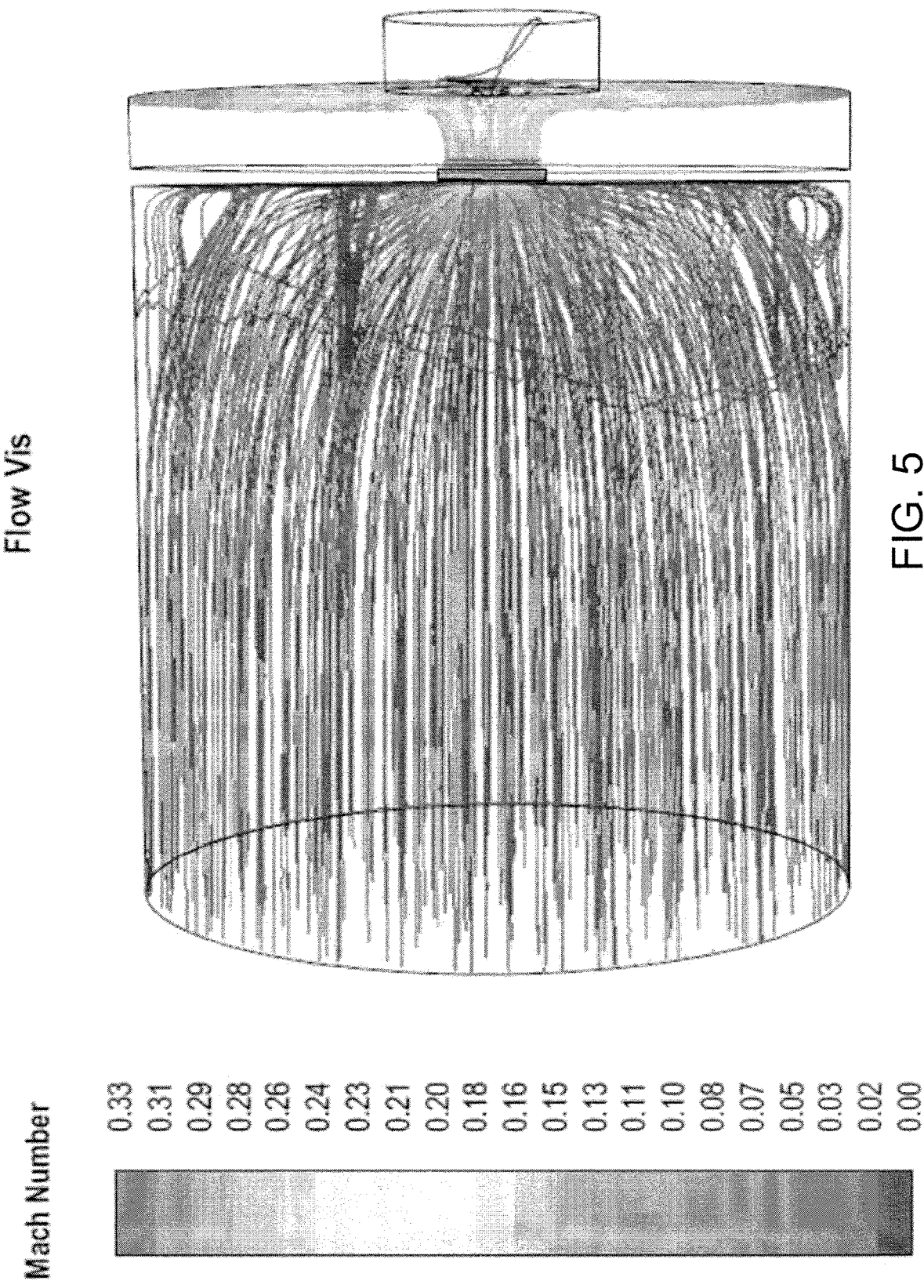
FIG. 5 is a graphical illustration of an air flow into a particle collection device, in accordance with various embodiments.

In various embodiments, and with reference to FIG. 4, a graphical illustration of a 5 micron particle track into the particle collection device or aero lens device is provided. The particles are focused and collected into the particle collection chamber. In various embodiments, and with reference to FIG. 5, a graphical illustration of the flow of the fluid stream is provided.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor comprising:
a combustor shell defining a plurality of first impingement holes;

a particle collection panel comprising a plurality of particle collection chambers and defining a plurality of second impingement holes, wherein the particle collection panel is disposed inward of the combustor shell; and a combustor panel defining a plurality of effusion holes, wherein the combustor panel is disposed inward of the particle collection panel;

wherein each particle collection chamber of the plurality of particle collection chambers comprises a closed inward end and an opening defined in an outward end;

wherein a centerline axis of the opening of each particle collection chamber of the plurality of particle collection chambers intersects a respective first impingement hole of the plurality of first impingement holes; and wherein a space is defined between the opening defined in the outward end of each particle collection chamber of the plurality of particle collection chambers and the combustor shell.

2. The combustor of claim 1, wherein a first quantity of the first impingement holes corresponds to a second quantity of the particle collection chambers.

3. The combustor of claim 2, wherein the first quantity equals the second quantity.

4. The combustor of claim 1, wherein a first cumulative cross-sectional area of the plurality of first impingement holes is equal to a sum of a second cumulative cross-sectional area of the plurality of second impingement holes and a third cumulative cross-sectional area of the plurality of effusion holes.

5. The combustor of claim 1, wherein each first impingement hole of the plurality of first impingement holes has a first diameter, wherein a distance between the combustor shell and the opening defined in the outward end of each particle collection chamber of the plurality of particle collection chambers is more than 0.5 times the first diameter.

6. The combustor of claim 1, wherein each first impingement hole of the plurality of first impingement holes has a first diameter, wherein a distance between the combustor shell and the opening defined in the outward end of each particle collection chamber of the plurality of particle collection chambers is greater than 0.5 times the first diameter and less than 2.0 times the first diameter.

7. The combustor of claim 1, wherein each first impingement hole of the plurality of first impingement holes has a first diameter and the opening of each particle collection chamber has a second diameter, wherein the second diameter is at least 0.2 times the first diameter.

8. A gas turbine engine comprising:
a combustor shell defining a plurality of first impingement holes;

a particle collection panel comprising a plurality of particle collection chambers and defining a plurality of second impingement holes, wherein the particle collection panel is disposed inward of the combustor shell; and a combustor panel defining a plurality of effusion holes, wherein the combustor panel is disposed inward of the particle collection panel;

wherein each particle collection chamber of the plurality of particle collection chambers comprises a closed inward end and an opening defined in an outward end;

wherein a centerline axis of the opening of each particle collection chamber of the plurality of particle collection chambers intersects a respective first impingement hole of the plurality of first impingement holes; and wherein a space is defined between the opening defined in the outward end of each particle collection chamber of the plurality of particle collection chambers and the combustor shell.

9. The gas turbine engine of claim 8, wherein each first impingement hole of the plurality of first impingement holes has a first diameter, wherein the opening of each particle collection chamber of the plurality of particle collection chambers is offset in the aft direction about 0.5 times the first diameter.

* * * * *